United States Patent Office

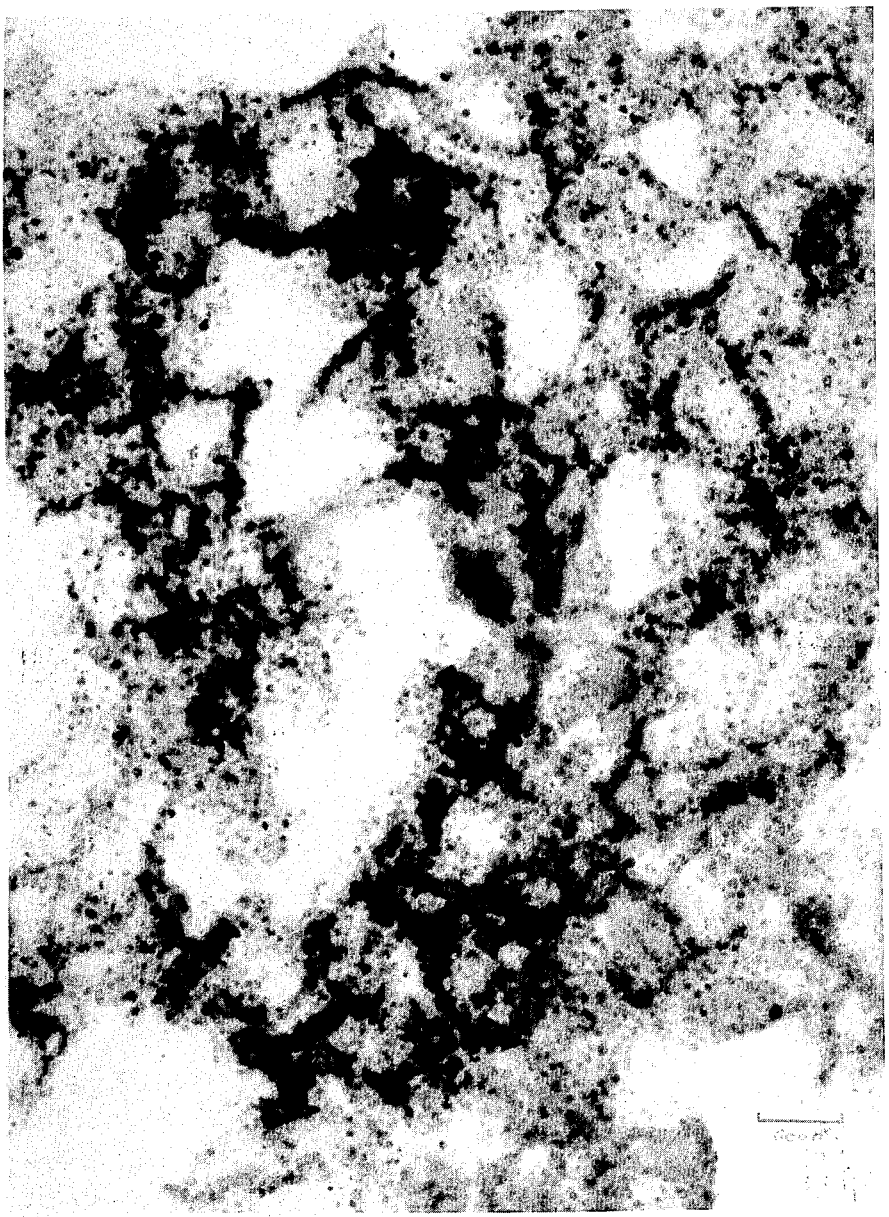

3,723,353
Patented Mar. 27, 1973

3,723,353
COPPER CATALYST
Jacobus J. M. G. Eurlings, Valkenburg, John W. Geus, Geleen, and Cornelis A. M. Weterings, Stein, Netherlands, assignors to Stamicarbon N.V., Heerlen, Netherlands
Filed May 25, 1970, Ser. No. 40,330
Int. Cl. B01j 11/42
U.S. Cl. 252—459
4 Claims

ABSTRACT OF THE DISCLOSURE

The present invention relates to a process for the preparation of a catalyst mass from dilute aqueous solutions of copper and nickel salts, particularly precipitation of a copper compound out of an aqueous solution onto a thermally stable carrier material suspended therein. The copper compound is secured to the carrier material via a nickel compound and is reduced to metallic copper after being so secured. Copper catalysts have a wide field of application in dehydrogenation reactions, e.g. the dehydrogenation of cyclohexanol to cyclohexanone and of isopropyl alcohol to acetone. Copper catalysts are also very suitable for carrying out selective hydrogenation processes, There are indications that metallic copper surfaces may greatly accelerate the oxidation of hydrocarbons e.g. cumene via radical mechanisms.

BACKGROUND OF THE INVENTION

Since the catalytic activity of heterogeneous catalyst systems is generally proportional to the size of the active surface area per unit volume of the catalyst, one will try to get very small active particles. In that case a maximum surface area per unit weight of active material will be obtained. In the case of copper it is extremely difficult to prepare minute particles. The reason is that, during reduction, copper very easily agglomerates to large particles. This drawback holds both for catalysts prepared by the coprecipitation method and for those prepared by impregnation. It is known from literature, see Weaver, C., Chem. Ind. (London), page 370 (1965) that the interaction between pure metal particles and ionogenic, thermally stable carriers, such as silica, is weak. As a result, extremely small metal particles will easily migrate along the surface of an ionogenic carrier at temperatures of over e.g. 200° C. Owing to this effect conglomeration and sintering of the metal particles to larger particles cannot be avoided at elevated temperatures. Since the mobility of the metal particles decreases with increasing size, the migration of the metal particles will cease when a given (relatively large) particle size is reached. Only if the metal is homogeneously distributed over the carrier, which implies maximum spacing between the particles, will the agglomeration of the metal particles remain limited to some extent.

The line of thought on which the method of preparing an improved copper catalyst is based will now be further explained.

Unlike pure metals, metal oxides adhere extremely well well to ionogenic surfaces. Consequently, metal oxide particles present on the surface of a carrier material will be less liable to sinter, especially in the absence of water vapour. Furthermore, a metal oxide usually adheres very well to the corresponding metal, particularly if either the metal or the oxide is present in the form of a thin film. This implies that a thermally stable metallic catalyst may be obtained if that part of the catalytically active particles which is in contact with the carrier is not reduced. This is in general, difficult to be realized, since the speed of reduction of small metal oxide particles depends on the speed with which nuclei of the metal phase are formed. Once a metallic nucleus is present in a particle, this nucleus may grow so fast that the oxide is rapidly and completely converted to metal. This applies i.a. to copper oxide, which can be quickly and completely reduced to the pure metal at temperatures below 200° C., even if the oxide is present in the form of small particles homogeneously distributed on a thermally stable carrier. As a consequence, copper catalysts generally have a very low resistance to temperatures exceeding 200° C.

With the usual carriers, such as silica and alumina oxide, nickel forms compounds which are much more difficult to reduce than the nickel oxide itself. Thus, with silica a hydrosilicate may be formed which can be slowly reduced only at temperatures exceeding 600° C., and even then, reduction will proceed at a slow rate. The boundary layer between the nickel oxide (or nickel hydroxide) and the carrier is a compound which is reduced at higher temperatures than the nickel oxide itself. Owing to this, thermally stable nickel-on-carrier catalysts can be readily prepared.

It is further known that metals adhere very well to one another.

SUMMARY OF THE INVENTION

The basic principle of the invention now is that the good adhesion of copper via nickel and, subsequently via a nickel compound, to a thermally stable carrier material offers the possibility of reducing substantially all of the precipitated copper compound to metallic copper without excessive growth of the copper particles. This leads to a catalyst with considerably higher activity.

According to the invention, a copper containing catalyst is prepared in three separate steps: a first step in which a homogeneous film of hydrated nickel oxide is precipitated onto the thermally stable carrier material, a second step in which an insoluble copper compound is precipitated, in homogeneous distribution onto the film of hydrated nickel oxide, and a third step in which the loaded carrier material is subjected to a reductive treatment at a temperature higher than 150° C.

In view of the extremely small dimensions of the particles precipitated onto the carrier material, the copper atoms will, during the reduction process, easily diffuse into the nickel layer and the nickel atoms into the copper layer, and thus form an alloy. The metallic copper particles being formed during the reduction will then remain firmly bonded to the nickel layer which, in turn, is firmly bonded to the carrier via a difficult to reduce nickel hydrosilicate or silicate.

The catalyst can be obtained by means of precipitations known in themselves which, according to the principle of the invention, are carried out one after the other with the purpose to bring about a special effect, namely to ensure better anchoring of the copper to and more uniform distribution on the carrier material, which effect would not be obtained e.g. if said operations were carried out in the reverse order. A catalyst mass thus prepared proves to have a very much higher thermal stability than the catalyst masses described in the above-mentioned literature, in which the copper and nickel compounds on the carrier, are present chiefly side by said and in non-uniform distribution. The reduction can therefore be carried out without any objection at temperatures considerably higher than 150° C. The reduction is preferably carried out at a temperature higher than 400° C., more particularly between 500° C. and 1000° C. At this latter temperature, which is extremely high for copper reduction, a substantially complete reduction is achieved. Since the copper particles remain small despite the high reduction temperature, the catalyst according to the invention has a very high activity.

DETAILED DISCUSSION OF PRESENTLY PREFERRED EMBODIMENTS OF THE INVENTION

More in detail, the process according to the invention comprises in a first step, suspending the highly dispersed carrier material in a dilute solution of a nickel salt, increasing the pH of the suspension with vigorous agitation, from a value lower than 5 to a value of approxmately 7 at a rate of at most 0.1 pH unit per minute, separating the loaded carrier material from the liquid and washing it subsequently in a second step, suspending said loaded carrier material in a dilute solution of a copper-tartaric acid complex at a pH value higher than 6, next with vigorous agitation either injecting a salt of hydroxylamine such as $HCO_3^-$-, $Cl^-$-, $HSO_4^-$- or $CH_3CO_2^-$-salts into the suspension at a temperature between 40° C. and 100° C. or adding a monosaccharide such as glucose, fructose, mannose, etc. to it at a temperature between 0° C. and 40° C., and subsequently heating the suspension to a temperature between 60° C. and 100° C., separating the carrier loaded with the nickel and copper compounds from the liquid after some time, and washing and drying the mass obtained, and in a third step, reducing the resulting mass thus obtained at a temperature between 150° C. and 1000° C.

The first step in the above-mentioned procedure, i.e. precipitation of hydrated nickel oxide onto a thermally stable carrier, is described in more detail in the U.S. patent application No. 721,051 filed Apr. 12, 1968 and continuation-in-part application No. 858,318 filed Sept. 16, 1969, both abandoned in favor of continuation-in-part application No. 108,081 filed Jan. 20, 1971. In carrying out this step it is essential that the surface of the carried material be coated homogenously with the hydrated nickel oxide. This can easily be achieved by the method described in the above-mentioned patent applications.

Many forms of silica customarily employed as carrier material may be used also here e.g. kieselguhr, AEROSIL or silica precipitated in situ, as also alumina, titanum dioxide, chromium oxide, magnesium oxide and similar thermally stable substances. The quantity of nickel to be precipitated onto said substances depends entirely on the required activity and/or selectivity of the catalyst to be prepared, and may vary in relation to the quantity of carrier material between very wide, easily adjustable and well reproducible limits from 5 percent to 200 percent by weight.

The quantity of copper to be precipitated can also be selected between very wide limits; the copper-to-nickel ratio in the catalyst can be varied between one and one hundred. If the precipitation of the copper compound is effected in the right way, the dimensions of the biggest particles obtained will be between 150 and 200 A. units. These dimensions are not altered by calcination and/or reduction of the copper compounds precipitated, so that the catalyst according to the invention has a very high thermal stability. The reduction can be carried out without any objection at temperatures between 600° C. and 1000° C. Owing to this, the catalyst prepared by the method according to the invention can also be very well regenerated at high temperature.

Since, in the present case, the conditions under which first hydrated nickel oxide and next cuprous oxide are precipitated can be very accurately defined and controlled, catalysts having excellently reproducible catalytic properties can be prepared with a high degree of freedom in the choice of the copper-nickel ratio and of the degree of loading of the thermally stable carrier material with catalytically active material.

The precipitation of the copper compound (cuprous oxide) is based on the well-known phenomenon that precipitation may take place at a pre-established pH desired for this precipitation, if use is made of the difference in solubility of the complexed ions of the copper compound to be precipitated, said ions corresponding to different copper valencies. In that case, the ratio between the rate at which the compound to be precipitated migrates too the surface of the carrier material already loaded with hydrated nickel oxide and the rate at which said compound is generated in the solution should however be so adjusted that the concentration of the poorly soluble compound in the solution does not exceed the value required for the formation of isolated stable nuclei in the solution.

CERTAIN DEFINITIONS

It is therefore essential in the present method, that, if the valencies of the ions of the copper to be precipitated are altered at a preset pH value and in the presence of a suspended carrier material, this should be done homogeneously and gradually and under controlled conditions so as to ensure precipitation of sufficiently small particles. By "homogeneously" is understood here that the concentrations of the ions of the old and new valencies do not depend on the place in the solution, not even if arbitrarily small units of volume are considered; by "gradually" is understood that the rate of increase in concentration per unit time of ions changing from the old to the new valency is lower than the rate at which the compound to be precipitated migrates from the solution to the surface of the carrier material. As has been said before, this is achieved in that in the dilute solution of a copper-tartaric acid complex in which solution the carrier material, already loaded with the hydrated nickel oxide, is present in suspended form a reducing agent is made to react, under controlled conditions of temperature, with agitation and at a preset pH value, so that cuprous oxide will precipitate exclusively onto the surface of the carrier material loaded with hydrated nickel oxide, said doubly loaded material being subsequently separated from the liquid and subjected to further treatments such as drying, calcination and/or reduction. By "controlled" conditions of temperature is understood here that a fixed, preset temperature, or the variation in temperature with time, is accurately adapted to the precipitation conditions desired. The entire quantity of reducing agent may be added at the beginning of the reaction, for instance when a monosaccharide is used. However, under certain conditions it may be preferable to inject the reducing agent into the solution in controlled quantities, for instance when a hydroxylammonium salt is used. By "injecting" is understood here that the reducing agent and the suspension of the carrier material loaded with hydrated nickel oxide are brought into contact with each other without any other phase being present in the immediate vicinity. In this way the reducing agent is extremely quickly distributed throughout the agitated solution (suspension) without the distribution being opposed by surface tensions, so that the distribution of ions of different valencies remains homogeneous during the gradual change. By "controlled quantities" is understood here that the quantity of reducing agent to be injected per unit time should be accurately adapted to the reaction conditions required to obtain a catalyst mass of the desired structure, i.e. small, isolated catalytically active particles of cuprous oxide on the carrier already loaded with hydrated nickel oxide.

EXAMPLES

The invention will now be illustrated by a number of examples. First of all, examples are given of the preparation of catalysts by the method according to the invention, whereupon the results of tests made with said catalysts will be given.

Example I

The preparation of a catalyst to be used in the process according to the invention was carried out in two steps. First a highly porous silica preparation was coated with hydrated nickel oxide, whereupon, in a subsequent reaction, copper (I) oxide was precipitated onto the loaded carrier material.

Step A: Loading the silica with hydrated nickel oxide.—124.0 grams of $Ni(NO_3)_2.6H_2O$, 50.1 grams of urea and 59.0 grams of $NaNO_2$ were dissolved in 3 litres of demineralized water, whereupon 50 grams of silica (Aerosil, 380 m.$^2$g.$^{-1}$) were suspended in the solution. Next, the suspension was heated at 100° C. for 18 hours while being vigorously agitated. During this treatment the pH value of the suspension increased from approximately 3 to approximately 7. The loaded carrier material could then be very easily filtered off; it was washed twice with the water.

Upon drying at 120° C., 86 grams of loaded silica with a composition of 27.4 percent by weight of nickel and 50.3 percent by weight of $SiO_2$ were obtained. To determine the size of the nickel particles, a sample of the material was heated at 500° C. in a stream of hydrogen for 18 hours. Next, the surface area of the nickel particles was measured by hydrogen adsoprtion; this proved to be 130 m.$^2$/g. of nickel showing that the particle size was not more than 50 A. units. The total surface area of the material upon reduction was 306 m.$^2$/g.

Step B: Loading the material obtained in Step A with copper (I) oxide.—87 grams of potassium-sodium tartrate.$4H_2O$, 33 grams of $Na_2CO_3$ and 74.0 grams of $Cu(NO_3)_2.3H_2O$ were dissolved in 1 litre of water. This solution was added to a suspension containing, in 2 l. of water, 35.5 grams of the above-mentioned silica loaded with nickel oxide: finally at room temperature 30.5 grams of glucose ($C_6H_{12}O_6.H_2O$) and 18.6 grams of urea were dissolved in the suspension thus obtained. Next, the suspension was heated at 80° C. for 18 hours whilst being vigorously agitated; during this treatment the pH value of the suspension first dropped from 8.1 to 5.9 and then increased again to 6.3. After 18 hours the carrier material, now loaded with copper and nickel, was readily filtered off and washed twice with the water.

Upon drying at 120° C., 55 grams of catalyst was obtained, consisting of 30.1 percent by weight of copper, 16.6 percent by weight of nickel and 27.1 percent by weight of $SiO_2$. After calcination and subsequent reduction in a stream of hydrogen for 18 hours at 700° C., a copper-nickel alloy was obtained whose average particle size was 170 A. units as appeared from the broadening of the X-ray reflections.

The figure is an electron microscopic photograph of the catalyst obtained in Example I upon reduction.

Example II

This example relates to the preparation of a catalyst, using kieselguhr as carrier material.

Step A: Loading the kieselguhr with hydrated nickel oxide.—73.5 grams of $Ni(NO_3)_2.6H_2O$, 30 grams of urea and 69 grams of $NaNO_2$ were dissolved in 3 litres of demineralized water, whereupon 30 grams of kieselguhr (15 m.$^2$/g.) was suspended in the solution. Next, the suspension was heated at 100° C. for 18 hours while being vigorously agitated. During this treatment the pH value of the suspension increased from approximately 3 to approximately 6. The loaded carrier material could then be very readily filtered off; the filter residue was washed twice with hot water, whereupon it was used in Step B without having undergone further treatment.

Step B.—Loading the material obtained in step A with copper (I) oxide.—133.5 grams of potassium sodium tartrate.$4H_2O$, 206 grams of $NaHCO_3$, 8 grams of $Na_2CO_3.10H_2O$ and 114 grams of $Cu(NO_3)_3.3H_2O$ were dissolved in 2 litres of water. The solution was added to a suspension of the material obtained in step A in 1 litre of water. Finally, 62 grams of glucose was dissolved in the suspension thus obtained. The suspension was heated for 18 hours at 100° C. whilst being vigorously agitated. During this treatment the pH of the suspension first dropped from 8.5 to 6.0 and subsequently increased again to 7.8. After 18 hours the carrier material, now loaded with nickel and copper, was readily filtered off and washed twice with hot water. After drying at 120° C., 81 grams of catalyst was obtained. The composition of this catalyst was 34.4 percent by weight of copper, 16.7 percent by weight of nickel and 26.1 percent by weight of $SiO_2$. Judged from the broadening of the X-ray reflections, the size of the copper (I) oxide particles was 200 A. units. The same size was also found after reduction at 600° C. and at 900° C.

The following examples relate to the hydrogenation of oils.

Example III

The hydrogenation process was carried out in a chromium-nickel steel autoclave of one litre capacity, provided with an agitator. The autoclave was filled with half a litre of refined soybean oil with a free fatty-acid content of 0.05 percent by weight and an iodine number of 133. The composition of the fatty acids, determined by gas chromatography (total fatty-acid content=100%), of this starting material was as follows:

| | Percent |
|---|---|
| Linoleic acid | 54.0 |
| Linolenic acid | 7.7 |
| Oleic acid | 23.0 |
| Lauric acid | 0.1 |
| Palmitic acid | 10.6 |
| Stearic acid | 4.6 |

The oil had been previously treated with hydrogen in order to remove dissolved oxygen from the system. The catalyst used was the catalyst prepared in Example I, which, however, was reduced in the oil under reaction conditions. Before this treatment, the catalyst had been calcined in air at 600° C. For the present experiment such a quantity of catalyst was added that the percentage copper in the oil was 0.1 percent by weight (1.4 grams of catalyst). After the autoclave had been closed, the air over the oil was removed, whereupon the contents of the autoclave were brought at a hydrogen pressure of 5 atmospheres and a temperature of 200° C. The reaction was started by switching on the agitator. After an induction period of 2 minutes (characteristic of "wet" reduction of the catalyst), the progress of the reaction was followed by observing the pressure drop in the hydrogen storage vessel (the hydrogen pressure in the autoclave was maintained at the constant value of 5 atmospheres) and the change in refractive index of the oil. Upon intermediate sampling the hydrogenation process was terminated by stopping the agitator 28 minutes after the beginning of hydrogen uptake, at which moment the iodine number was 102. After that, no more hydrogen was taken up.

Taking into account the loss of soybean oil during the hydrogenation process owing to the sampling operations, the activity of the catalyst could be determined to be 43.2 litres of $H_2$(N.P.T.)/hr./gr. Cu.

The intermediate samples and the final sample were characterized by the following fatty-acid compositions, determined by gas chromatography:

| Minutes | 10 | 20 | 28 |
|---|---|---|---|
| Iodine number | 119 | 112 | 102 |
| Linoleic acid, percent | 47.3 | 40.7 | 33.3 |
| Linolenic acid, percent | 4.8 | 3.2 | 2.2 |
| Oleic acid, percent | 31.4 | 38.0 | 44.7 |
| Lauric acid, percent | 0.1 | 0.1 | 0.1 |
| Palmitic acid, percent | 11.4 | 11.4 | 12.6 |
| Stearic acid, percent | 5.0 | 6.6 | 7.1 |

After this "wet" reduction of the catalyst, the copper and nickel contents of the oil determined after removal of the catalyst by filtration, proved to be Cu:3.5 mg./kg.; Ni: 0.23 mg./kg.

Eample IV

The experimental conditions and the starting material were the same as those in Example III. The reaction temperature was 200° C., the hydrogen pressure was 5 atmospheres absolute, whilst the oil contained 0.1 percent by weight of Cu. The same catalyst was used which, however, had previously been calcined at 600° C. and next reduced for 18 hours at 400° C. in a stream of hydrogen and subsequently protected from oxidation by suspension in soybean oil previously treated with hydrogen. Hydrogen uptake set in immediately upon starting the agitator. Samples were taken at iodine numbers of 118, 106 and 96. The iodine number of 96 was reached this time after 10 minutes, from which followed an activity of 168 litres of $H_2$ (N.P.T.)/hr./gr. Cu.

The intermediate samples and the final sample were characterized by the following fatty-acid compositions, determined by gas chromatography:

| Minutes | 4 | 7 | 10 |
|---|---|---|---|
| Iodine number | 118 | 106 | 96 |
| Linoleic acid, percent | 44.4 | 35.0 | 25.8 |
| Linolenic acid, percent | 5.1 | 2.9 | 1.5 |
| Oleic acid, percent | 33.5 | 43.8 | 53.9 |
| Lauric acid, percent | 0.1 | 0.1 | 0.1 |
| Palmitic acid, percent | 11.6 | 12.2 | 12.0 |
| Stearic acid, percent | 5.3 | 6.0 | 6.7 |

The reduction with hydrogen at 400° C. proved insufficient to prevent the dissolution of copper and nickel in the oil. The contents of said metals were: Cu: 2.9 mg./kg.; Ni: 0.29 mg./kg.

Example V

Here again, the catalyst prepared according to Example I was used; said catalyst was first calcined at 600° C. and then reduced for 18 hours in a stream of hydrogen at 600° C. Next, the reduced catalyst was introduced into the previously degassed soybean oil to be hydrogenated, without having been in contact with atmospheric oxygen. The experimental conditions including the starting material during the hydrogenation process were the same as in Examples III and IV; the temperature was 205° C. The rate of hydrogen uptake was higher than in Example IV, viz. 192 litres of $H_2$ (N.P.T.)/hr./gr. Cu.

The hydrogenated oil was subsequently filtered off from the catalyst in a hydrogen atmosphere; the hardened oil showed copper and nickel contents below 0.1 p.p.m. without having been further purified. The linolenic acid-content of the hydrogenated oil was 30 percent of that of the starting material, and the linoleic-acid content was 58 percent of the original content.

Example VI

The experimental conditions were the same as those in Example V (including the starting material and the pretreatment of the catalyst) with the exception of the hydrogenation temperature which in this case was 185° C. Again the hydrogen absorption set in immediately upon starting the agitator. After 8 minutes, an iodine number of 103 was reached; from this follows an activity of 188 litres of $H_2$ (N.P.T.)/hr./gr.Cu, which is almost equal to the value found in Example V at a temperature of 205° C. with a catalyst pretreated in the same way.

The hardened oil, again determined without further purification, contained less than 0.1 p.p.m. of copper and nickel. The fatty acid composition was:

|   | Percent |
|---|---|
| Linoleic acid | 29.4 |
| Linolenic acid | 2.2 |
| Oleic acid | 51.5 |
| Lauric acid | 0.1 |
| Palmitic acid | 11.8 |
| Stearic acid | 5.2 |

Example VII

The catalyst used in this example was prepared according to the procedure of Example I, but was a low-nickel type catalyst. Such a catalyst will prove particularly suited for selective hydrogenation of the linolenic acid present in soybean oil. The catalyst contained 4.4 percent by weight of nickel, 45.2 percent by weight of copper and 26.5 percent by weight of silica. The catalyst was pretreated as described in Example VI and the experimental conditions including the starting material during hydrogenation were also equal to those in Example VI. After 15 minutes an iodine number of 116 was reached; from this follows an activity of 56 litres of $H_2$(N.T.P.)/hr./gr.Cu.

The composition of the hardened oil was as follows:

|   | Percent |
|---|---|
| Linoleic acid | 46.0 |
| Linolenic acid | 2.1 |
| Oleic acid | 35.4 |
| Lauric acid | 0.1 |
| Palmitic acid | 11.8 |
| Stearic acid | 4.7 |

From these data follows a K value $$K = \frac{k_{\text{linolenic acid}}}{k_{\text{linoleic acid}}}$$

of 5.

Example VIII

In this case soybean oil was hydrogenated with a catalyst prepared according to Example I, but containing 24.3 percent by weight of nickel, 23.7 percent by weight of copper and 27.3 percent by weight of silica. The pretreatment of the catalyst and the experimental conditions and the starting material during hydrogenation were the same as those in Example VI except for the catalyst content, which was 0.05 percent by weight of copper.

After 10.5 minutes an iodine number of 101 was reached from which it follows that the activity was 297 litres of $H_2$ (N.T.P.)/hr./gr.Cu.

The composition of the hardened oil was as follows:

|   | Percent |
|---|---|
| Linoleic acid | 30.7 |
| Linolenic acid | 2.3 |
| Oleic acid | 49.3 |
| Lauric acid | 0.1 |
| Palmitic acid | 11.7 |
| Stearic acid | 5.9 |

Example IX

In this example the activity of copper-nickel catalysts prepared by the method according to the invention is compared to the activities of now currently used copper-nickel catalysts as described in literature. In the table below, a number of hydrogenation rates are listed which have been measured for catalysts prepared by the method according to the invention. The hydrogenation activity was measured for purified soybean oil at a hydrogen pressure of 5 bars. The hydrogenation rate is defined here as the average rate at which the first 25 percent of the double bonds in the oil are saturated.

| Type of catalyst | Percent catalyst in oil | Reduction temp., °C. | Hydrogenation temp., °C. | Activity litres $H_2$ (N.T.P.)/hr./gr. Cu | Remark |
|---|---|---|---|---|---|
| See Example: | | | | | |
| I | 0.1 | 600 | 205 | 192 | |
| I | 0.1 | 600 | 185 | 188 | |
| I | 0.05 | 600 | 183 | 150 | |
| II | 0.05 | 600 | 142 | 59.1 | |
| I | 0.1 | 200 | 200 | 43.2 | "Wet" reduction. |
| I | 0.1 | 400 | 200 | 168 | |
| II | 0.1 | 900 | 200 | 165 | |

From the data of the table above it can be concluded that at a hydrogen pressure of 5 bars and hydrogenation temperatures exceeding 180° C. catalysts reduced at a sufficiently high temperature show an activity of 150–200 litres of $H_2$ (N.T.P.)/hr./gr. Cu. At 142° C. the activity is still approx. 60 litres of $H_2$ (N.T.P.)/hr./gr. Cu.

British patent specification 1,122,398 states the activities of now currently used copper-nickel catalysts. The activity of catalysts containing copper as the only active component, at 185° C., a hydrogen pressure of 5 bars and 0.05 percent by weight of copper in soybean oil is 5.19 litres of $H_2$ (N.T.P.)/hr./gr. Cu. The activity of catalysts in which 30 percent by weight of the copper has been replaced by nickel is more than 3 times as high per gram of copper than that of catalysts containing copper only. Consequently, the activity of the current copper-nickel catalysts at a hydrogenation temperature of 185° C. amounts to approximately 15 litres of $H_2$ (N.T.P.)/hr./gr. Cu.

This means that the remarkable activity of the catalyts prepared by the method according to the invention is approximately ten times as high as that of the current cataylsts based on copper and nickel. Even at a temperature of 140° C. and a hydrogen pressure of 5 bars the activity of catalysts prepared by the method according to the invention is still approx. 3 times as high as that of the current copper-nickel catalysts.

There are indications showing that for edible oils the rate of hydrogenation is directly proportional to the hydrogen pressure (Eldib and Albright (Ind. Eng. Chem., 49,895 (1957)). If this is taken as a basis, the activity of copper-nickel catalysts according to the invention at atmospheric pressure and a hydrogenation temperature of 185° C. is still approximately twice as high as that of the current copper-nickel catalysts ta 185° C. and a hydrogen pressure of 5 bars.

While the presently preferred embodiment of this invention utilizes nickel as the interlayer between the copper and the supporting material, other metals could also be used as the interlayer. Such other metals include those metals of Group VIII such as iron and cobalt, or other metals as chromium, which will form a homogeneous deposit of an insoluble compound by nucleation on the supporting material essentially in the manner described above for nickel (with, of course, the copper deposited thereupon). In some cases, use of such other metals may be preferred in order to avoid contributions to the catalytic activity from the non-selective nickel component, or for other reasons in specific catalytic processes.

What is claimed is:

1. A process for preparing a catalyst mass, said process comprising the steps of:
   (a) precipitating a homogeneous layer of hydrated nickel oxide onto a thermally stable carrier material by
      forming a highly disperse suspension of said carrier material in a dilute solution of a nickel salt;
      raising the pH of said suspension, under vigorous agitation, from a value lower than 5.0 to a value of about 7.0 and at a rate not exceeding 0.1 pH unit per minute whereby a homogeneous layer of hydrated nickel oxide is precipitated onto said carrier material; and
      separating from said solution and washing said hydrated nickel oxide loaded carrier material;
   (b) precipitating a homogeneously distributed insoluble copper compound onto said hydrated nickel oxide layer by
      suspending said separated and washed hydrated nickel oxide loaded carrier material in a dilute solution of a complex of copper and tartaric acid having a pH over 6.0;
      vigorously agitating said suspension while injecting a salt of hydroxylamine into said suspension at a temperature of 40 to 100° C. so as to gradually and homogeneously cause an insoluble copper compound to precipitate onto said hydrated nickel oxide layer on said carrier material; and
      separating from said solution, washing and drying the resulting loaded carrier material; and
   (c) reducing said loaded carrier material with a stream of hydrogen at a temperature in the range of about 150° C. to 1000° C. to form said catalyst mass.

2. A process for preparing a catalyst mass, said process comprising the steps of:
   (a) precipitating a homogeneous layer of hydrated nickel oxide onto a thermally stable carrier material by
      forming a highly disperse suspension of said carrier material in a dilute solution of a nickel salt;
      raising the pH of said suspension, under vigorous agitation from a value lower than 5.0 to a value of about 7.0 and at a rate not exceeding 0.1 pH unit per minute whereby a homogeneous layer of hydrated nickel oxide is precipitated onto said carrier material; and
      separating from said solution and washing said hydrated nickel oxide loaded carrier material;
   (b) precipitating a homogeneously distributed insoluble copper compound onto said hydrated nickel oxide layer by
      suspending said separated and washed hydrated nickel oxide loaded carrier material in a dilute solution of a complex of copper and tartaric acid having a pH of over 6.0;
      adding a monosaccharide to said suspension at a temperature of 40 to 100° C.;
      heating said suspension under vigorous agitation to a temperature of between 60° C. and 100° C. so as to gradually and homogeneously cause an insoluble copper compound to precipitate onto said hydrated nickel oxide layer on said carrier material; and separating from said solution, washing and drying the resulting loaded carrier material; and
   (c) reducing said loaded carrier material with a stream of hydrogen at a temperature in the range of about 150° C. to 1000° C. to form said catalyst mass.

3. A catalyst mass consisting essentially of elementary copper particles predominantly of a size no greater than 250 A. units uniformly distributed upon and adhered to the surface of a thermally stable carrier material via an intermediate layer of nickel said catalyst being produced by process of claim 1.

4. The catalyst mass of claim 3 wherein the weight ratio of copper to nickel in the catalyst is in the range 1:1–1:100, wherein the weight ratio of nickel to carrier is in the range 5:100–200:100, and the carrier is a particulate material chosen from the group consisting of silica, alumina, titanium dioxide, chromium oxide, magnesium oxide and barium oxide.

References Cited
UNITED STATES PATENTS

| | | | |
|---|---|---|---|
| 3,184,417 | 5/1965 | Hort | 252—474 |
| 3,401,125 | 9/1968 | Jaffe | 252—439 |
| 3,472,787 | 10/1969 | Kucirka | 252—432 |
| 3,133,029 | 5/1964 | Hoekstra | 252—466 |
| 2,424,083 | 7/1947 | Finch et al. | 252—454 X |
| 2,400,709 | 5/1946 | Patrick | 252—454 X |
| 2,927,088 | 3/1960 | Michalko et al. | 252—466 B |
| 3,076,858 | 2/1963 | Frevel et al. | 252—466 B |
| 3,288,558 | 1/1966 | Briggs et al. | 252—474 X |
| 3,317,439 | 5/1967 | Stiles | 252—472 X |

FOREIGN PATENTS

| | | |
|---|---|---|
| 1,122,398 | 8/1968 | Great Britain. |

DANIEL E. WYMAN, Primary Examiner

W. H. CANNON, Assistant Examiner

U.S. Cl. X.R.

252—466, 474